(12) United States Patent
Shanker et al.

(10) Patent No.: US 6,914,780 B1
(45) Date of Patent: Jul. 5, 2005

(54) METHODS AND APPARATUS FOR COOLING A CIRCUIT BOARD COMPONENT USING A HEAT PIPE ASSEMBLY

(75) Inventors: Bangalore J. Shanker, Fremont, CA (US); Yida Zou, San Jose, CA (US); Sergio Camerlo, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 182 days.

(21) Appl. No.: 10/345,524

(22) Filed: Jan. 16, 2003

(51) Int. Cl.[7] .............................................. G06F 1/20
(52) U.S. Cl. ...................... 361/687; 361/700; 361/80.3; 361/104.33; 174/15.2; 62/259.2
(58) Field of Search ................................ 361/687, 699, 361/700; 165/80.3, 185, 104.26, 86, 104.33, 80.4; 174/15.2; 62/259.2

(56) References Cited

U.S. PATENT DOCUMENTS

| | | | |
|---|---|---|---|
| 3,913,665 A | * 10/1975 | Franklin et al. ........ 165/104.26 |
| 4,607,685 A | 8/1986 | Mitchell, Jr. ................ 165/80.3 |
| 5,198,887 A | 3/1993 | Brown ......................... 361/383 |
| 5,329,993 A | * 7/1994 | Ettehadieh ............. 165/104.33 |
| 5,646,824 A | 7/1997 | Ohashi et al. ............... 361/699 |
| 5,731,954 A | * 3/1998 | Cheon ......................... 361/699 |
| 5,754,401 A | 5/1998 | Saneinejad et al. |
| 5,875,545 A | 3/1999 | DeStefano et al. ............ 29/840 |
| 5,991,155 A | 11/1999 | Kobayashi et al. .......... 361/705 |
| 6,008,987 A | * 12/1999 | Gale et al. .................. 174/15.2 |
| 6,025,991 A | 2/2000 | Saito ........................... 361/704 |
| 6,025,992 A | 2/2000 | Dodge et al. ................ 361/704 |
| 6,034,874 A | 3/2000 | Watanabe ..................... 361/704 |
| 6,049,469 A | 4/2000 | Hood et al. .................. 361/818 |
| 6,198,630 B1 | 3/2001 | Cromwell ..................... 361/704 |
| 6,205,025 B1 | 3/2001 | Chen ........................... 361/704 |
| 6,293,331 B1 | 9/2001 | Wang .......................... 165/80.3 |
| 6,315,038 B1 | 11/2001 | Chiu ............................ 165/185 |
| 6,430,052 B1 | 8/2002 | Kordes et al. ............... 361/719 |
| 6,545,871 B1 | 4/2003 | Ramspacher et al. ....... 361/709 |
| 6,621,698 B2 | * 9/2003 | Chang ......................... 361/687 |
| 6,621,713 B2 | * 9/2003 | Amaike et al. ............. 361/687 |
| 6,728,104 B1 | * 4/2004 | Ahmad et al. ............. 165/80.3 |

OTHER PUBLICATIONS

TCM Thermal Reticle 32262, Research Disclosure, Feb. 1991, No. 322, Kenneth Mason Publications Ltd., England 1 Page.
Assembled Heat Sinks Folded Assemblies, Sep. 20, 2002, http://www.aavidthermalloy.com/products/foldedfin/index.shtml, 2 Pages.

* cited by examiner

Primary Examiner—Lisa Lea-Edmonds
(74) Attorney, Agent, or Firm—Chapin & Huang, L.L.C.; David E. Huang, Esq.

(57) ABSTRACT

A circuit board assembly has a circuit board coupled to a support plane and defining a space between the circuit board and the support member. A circuit board component mounts to the circuit board and is oriented within the space defined by the circuit board and the support plane. A heat pipe assembly, located within the defined space, has a relatively high thermal conductivity, compared to other thermally conductive materials, and transfers heat from the circuit board component to the support plane or carrier tray associated with the circuit board. The heat pipe assembly has an input portion that contacts the circuit board component and an output portion that contacts the support plane. The heat pipe assembly also has a compliant portion having a lower stiffness relative to the stiffness of either the input portion or the output portion. The compliant portion of the heat pipe assembly allows for displacement of the input portion relative to the output portion to limit the amount of stress generated by the heat pipe assembly on the circuit board component.

29 Claims, 7 Drawing Sheets

METHODS AND APPARATUS FOR COOLING A CIRCUIT BOARD COMPONENT USING A HEAT PIPE ASSEMBLY

BACKGROUND OF THE INVENTION

A typical circuit board includes a section of circuit board material (e.g., fiberglass, copper, vias, etc.) and circuit board components attached or mounted to the section of circuit board material. Examples of circuit board components include integrated circuits (ICs) that generate heat during operation. A fan assembly typically generates an air stream that passes over the circuit board components to conduct the heat away from the components. The air stream removes the heat so that the circuit board components do not operate in an unsafe (e.g., relatively high) temperature range that causes the components to perform improperly (e.g., generate a signal incorrectly) or sustain damage (e.g., overheat, burnout, etc.).

Some ICs include heat sinks to facilitate cooling. In general, a heat sink is a flanged metallic device that attaches directly to the package of the IC. As the IC generates heat, heat flows from the IC package to the heat sink, and dissipates into the surrounding air. The air stream generated by the fan assembly then carries the heat away from the location of the IC, thus cooling the IC.

Conventional circuit boards utilize a relatively large number of components that encompass a given amount of surface area or real estate on a component side of the circuit board. As the number of components on the circuit board increase, the amount of real estate available for traces (e.g., electronic connections among the components) decreases. Certain circuit boards include relatively larger circuit board components, such as application specific integrated circuits (ASICs), located on a first side (e.g., solder side) of the circuit board, opposite to a second side (e.g., component side) of the circuit board. By locating the circuit board components on the first (e.g., solder) side of the circuit board, manufacturers increase the amount of surface area or real estate available for traces on the second (e.g., component) side of the circuit board.

In order to cool the circuit board component when mounted to the first side of the circuit board, heat sinks have been conventionally utilized. For example, one such conventional heat sink includes a receptacle that fastens to a support assembly where the support assembly attaches to and supports the circuit board. The heat sink also includes an adjustable member that engages the receptacle and is movable relative to the receptacle in order to control a distance between the adjustable member and the circuit board component. The heat sink can therefore be moved to a position (e.g., in full contact with a circuit board component package, into contact with thermal transfer material that contacts the circuit board component package, etc.) that allows the heat sink to transfer heat from the circuit board component to another structure, such as the support assembly. Such heat transfer allows cooling of the circuit board component during operation even when the component resides in a location having limited space (e.g., an approximate 5 mm space between the circuit board and support assembly).

Heat pipes have been conventionally used for cooling processors (e.g., CPU's) associated with computerized devices. Heat pipes are devices that transmit heat from a first location, such as an area of relatively high temperature, to a second location, such as an area of relatively low temperature. For example, in laptop or mobile computers having processors generating power levels under 20 watts, low wattage heat pipes connect between the processor and a heat exchanger to remove the heat generated by the processor, thereby dissipating the heat from and cooling the processor. In another example, in workstation computers having processors generating power levels of up to 75 watts, heat pipes, combined with cooling fins from approximately 3 to 6 inches in height, remove heat from the processor. In such an arrangement, the heat pipe and cooling fin combination uses an air stream or airflow to cool the cooling fins, thereby lowering thermal resistance of the cooling fins. Thermal pouches have also been used to cool computer processors. The thermal pouch has a flexible bag, such as formed of a plastic material, for example, filled with a fluid. Once secured to a processor, the thermal pouch conforms to the shape of the processor and transfers heat away from the processor.

SUMMARY

Conventional techniques for utilizing heat pipes to cool circuit board components, such as processors suffer from a variety of deficiencies. Regarding the use of heat pipes with laptop or mobile computers, such heat pipes utilize a heat exchanger (e.g., a folded fin structure) to dissipate heat from the heat pipe. The addition of the heat exchanger to the heat pipe can, however, increase the manufacturing cost of the laptop computer. Furthermore, in certain cases, the heat exchanger is relatively large and is impractical for use in narrow spaces.

Regarding the use of heat pipes in workstation computers, the heat pipes, combined with cooling fins from approximately 3 to 6 inches in height, remove heat from the processor. The use of the cooling fins with the heat pipe, however, adds to the manufacturing cost of the workstation. As described, the heat pipe and cooling fin combination uses an air stream or airflow to remove heat from the cooling fins. In the case where the processor is located in a relatively narrow space (e.g., conventional circuit board assembly with approximately 5 mm of space between the circuit board and carrier tray or support plane) use of the relatively large cooling fins is impractical. Furthermore, providing adequate airflow to the cooling fins in a narrow space can be difficult.

Regarding the thermal pouch, while the pouch removes heat from a processor, the pouch is conventionally formed of a flexible plastic material containing a fluid. The flexible plastic material of the pouch, however, is susceptible to puncture by components surrounding the thermal pouch. Once punctured, the fluid within the thermal pouch can leak onto the processor or other circuit board components and damage or destroy the processor or circuit board components. In the case where the thermal pouch fails, a user may have to replace the processor or components if damaged by the leaking thermal pouch. Such replacement adds to the user's maintenance costs with respect to maintaining the processor.

The present invention is directed to techniques for cooling a circuit board component using a heat pipe having an outer shell that defines an input portion having a first stiffness, and an output portion having a second stiffness, and a compliant portion disposed between the input and output portions having a third stiffness that is less than either the first stiffness or the second stiffness. When the output portion of the heat pipe secures to a support structure (e.g., a metallic tray that operates as an electromagnetic interference shield) coupled to a circuit board, the input portion is capable of reliably contacting a component mounted to the circuit board for adequate heat transfer from the component to the support structure, through the heat pipe. The compliant portion of the heat pipe assembly allows for displacement of the input portion relative to the output portion to limit the amount of stress generated by the heat pipe on the circuit board component. The heat pipe assembly transfers heat from the circuit board component to the support structure, thereby minimizing the need to provide an air stream to remove heat from the circuit board component.

Embodiments improve upon the heat sinks of the prior art and provide mechanisms for cooling a circuit board component mounted to a circuit board. In one arrangement, a heat pipe assembly provides thermal transfer between a circuit board component, mounted to a circuit board, and a support plane substantially parallel to the circuit board. The circuit board and a first surface of the support plane define a space between the circuit board and support plane with the circuit board component oriented within the space defined by the circuit board and first surface of the support plane. The heat pipe assembly includes an input portion configured to thermally contact the circuit board component, the input portion having a first stiffness and an output portion configured to thermally contact the first surface of the support plane, the output portion having a second stiffness. The heat pipe assembly further includes a transfer portion integrally formed between the input portion and the output portion, the transfer portion having compliant portion having a third stiffness where the third stiffness of the compliant portion is less stiff than the first stiffness of the input portion and is less stiff than the second stiffness of the output portion. The third stiffness of the compliant portion allows relative displacement between the input portion and the output portion.

The heat pipe assembly of the present invention improves over the heat sinks of the prior art in that the present heat pipe assembly is formed as a single component, rather than from multiple components. The use of a single component heat pipe assembly rather than a multiple component heat sink can reduce manufacturing costs. Furthermore, the relatively lower stiffness of the compliant portion compared to the stiffness of the input portion or the output portion improves upon the heat sink of the prior art by allowing relative displacement between the input portion and the output portion. Such displacement limits the amount of stress induced by the heat pipe assembly on the circuit board component, thereby minimizing damage to the circuit board component caused by the heat pipe assembly.

In another arrangement, the input portion defines a substantially flat portion where the substantially flat portion provides a surface area of the heat pipe assembly in thermal contact with the circuit board component. Alternately, the output portion defines a substantially flat portion where the substantially flat portion provides a surface area of the heat pipe assembly in thermal contact with the support plane. The substantially flat portion of the input portion and of the output portion of the heat pipe assembly increases the surface area of the heat pipe assembly in contact with either circuit board component or the support plane, respectively, as compared to a substantially tubular (e.g., circular cross-section) heat pipe assembly. Such an increase in the contact surface area between the heat pipe assembly and the circuit board component provides a relatively greater transfer of heat from either the circuit board component to the input portion or from the output portion to the support plane.

In another arrangement, the input portion of the heat pipe assembly couples to a contact pad where the contact pad provides a coupling interface between the input portion and the circuit board component. The contact pad increases the thermal contact area between the circuit board component and the input portion, thereby increasing thermal transfer from the component to the input portion. The contact pad, furthermore, allows for removal of the input portion from the circuit board component.

In another arrangement, the support plane defines a channel where the channel provides coupling between the output portion and the support plane. The channel allows removable coupling between the output portion of the heat pipe assembly and the support plane and provides thermal contact between the output portion of the heat pipe assembly and the support plane.

In another arrangement the support plane includes a support plane heat pipe configured to provide thermal transfer from a first thermal region of the support plane to a second thermal region of the support plane. Such thermal transfer reduces the temperature of the first thermal region, thereby increasing the thermal conductivity of the support plane and reducing the thermal resistance of the support plane in the first thermal region.

The features of the invention, as described above, may be employed in electronic equipment and methods such as those of Cisco Systems of San Jose, Calif.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Embodiments improve upon the heat sinks of the prior art and provide mechanisms for cooling a circuit board component mounted to a circuit board. A circuit board assembly has a circuit board coupled to a support plane and defining a space between the circuit board and the support member. A circuit board component mounts to the circuit board and is oriented within the space defined by the circuit board and the support plane. A heat pipe assembly, located within the defined space, has a relatively high thermal conductivity, compared to other thermally conductive materials, and transfers heat from the circuit board component to the support plane or carrier tray associated with the circuit board. The heat pipe assembly has an input portion that contacts the circuit board component and an output portion that contacts the support plane. The heat pipe assembly also has a compliant portion having a lower stiffness relative to the stiffness of either the input portion or the output portion. The compliant portion of the heat pipe assembly allows for displacement of the input portion relative to the output portion to limit the amount of stress generated by the heat pipe assembly on the circuit board component.

Figure 1:
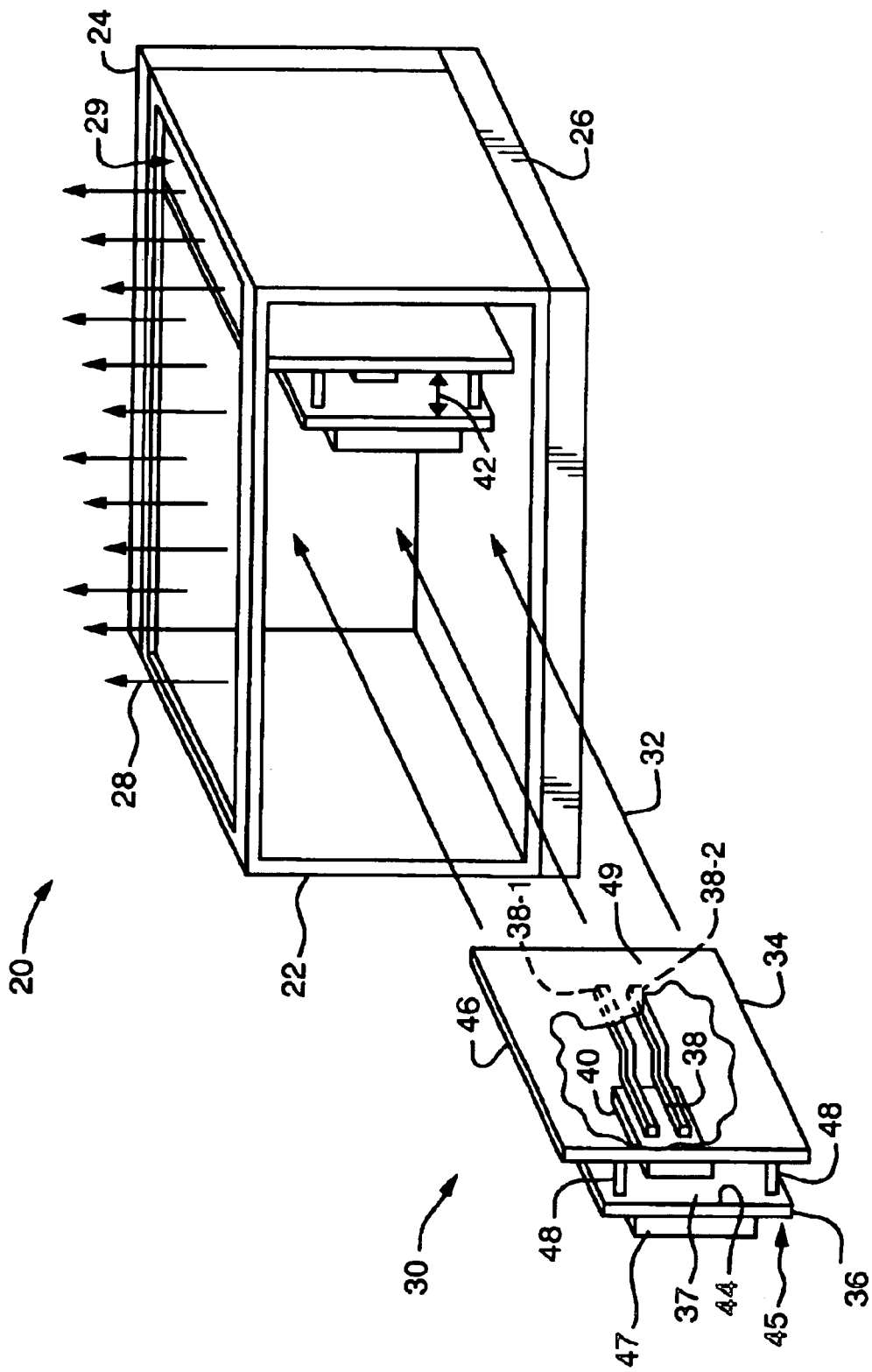
FIG. 1 is a perspective view of a computer system that is suitable for use by the invention.

FIG. 1 shows a computer system 20, suitable for use by the invention. The computer system 20 includes a card cage or chassis 22, a back plane 24, and a fan assembly 26 that provides an air stream 28 that flows through the card cage 22. The system 20 further includes multiple circuit board assemblies 30 which connect with the back plane 24 when installed in the card cage 22 in the direction 32.

Each circuit board assembly 30 includes a support plane or support member 34, a circuit board 36 including a section of circuit board material 37, a circuit board component (e.g., ASIC) 40 mounted to the section of circuit board material 37, and a heat pipe assembly 38. In one embodiment, the circuit board 36 coupled to the support plane 34 defines a space 42 between the circuit board 36 and the support member 34. For example, the defined space 42 is between approximately 5 mm and 7 mm in length. The circuit board component 40 is mounted to a first surface 44 of the circuit board 36 (e.g., solder surface) and is oriented between the circuit board 36 and a first surface 46 of the support plane 34 within the defined space 42 between the circuit board 36 and the support plane 34 (e.g., between the first surface 44 of the circuit board 36 and a first surface 46 of the support plane 34). Such a mounting orientation of the circuit board component 40 increases the surface area (e.g., real estate) available for additional components 47 or electrical traces on the second surface 45 of the circuit board 36 (e.g., component surface).

In one arrangement, each support member 34 includes side portions (e.g. standoffs) 48 that attach the circuit board 36 to the support plane 34. Each support plane 34 essentially operates as a carrier (e.g., carrier tray) for holding the circuit board 36 in place for proper alignment and connection with the back plane 24. In one arrangement, the support plane 34 includes a metallic material, such as stainless steel, that shields circuitry of the circuit board assembly 30 from external electromagnetic interference (EMI) sources.

Both the heat pipe assembly 38 and support plane 34 are made from materials having relatively high heat absorption characteristics (e.g., metal) so that heat from the circuit board component 40 transfers to the support plane 34 through the heat pipe assembly 38. The heat pipe assembly 38, however, provides relatively large thermal conductivity compared to other thermally conductive materials. For example, the thermal conductivity of stainless steel is approximately 50 w/K*m, the thermal conductivity of aluminum is approximately 200 w/K*m, and the thermal conductivity of copper is approximately 400 w/K*m. By comparison, the thermal conductivity of a conventional heat pipe assembly 38 (e.g. heat pipe) is approximately 3000 w/K*m. The thermal conductivity of the heat pipe assembly 38, therefore provides relatively rapid transfer of heat over relatively large distances with a negligible temperature drop.

During operation, the circuit board component 40 generates heat. Certain circuit board components 40, such as ASIC's, are relatively large and generate a relatively large amount of heat, for example approximately 100 watts. The heat pipe assembly 38 transmits the heat generated by the circuit board component 40 to the support plane (e.g., carrier tray) 34.

Figure 2:
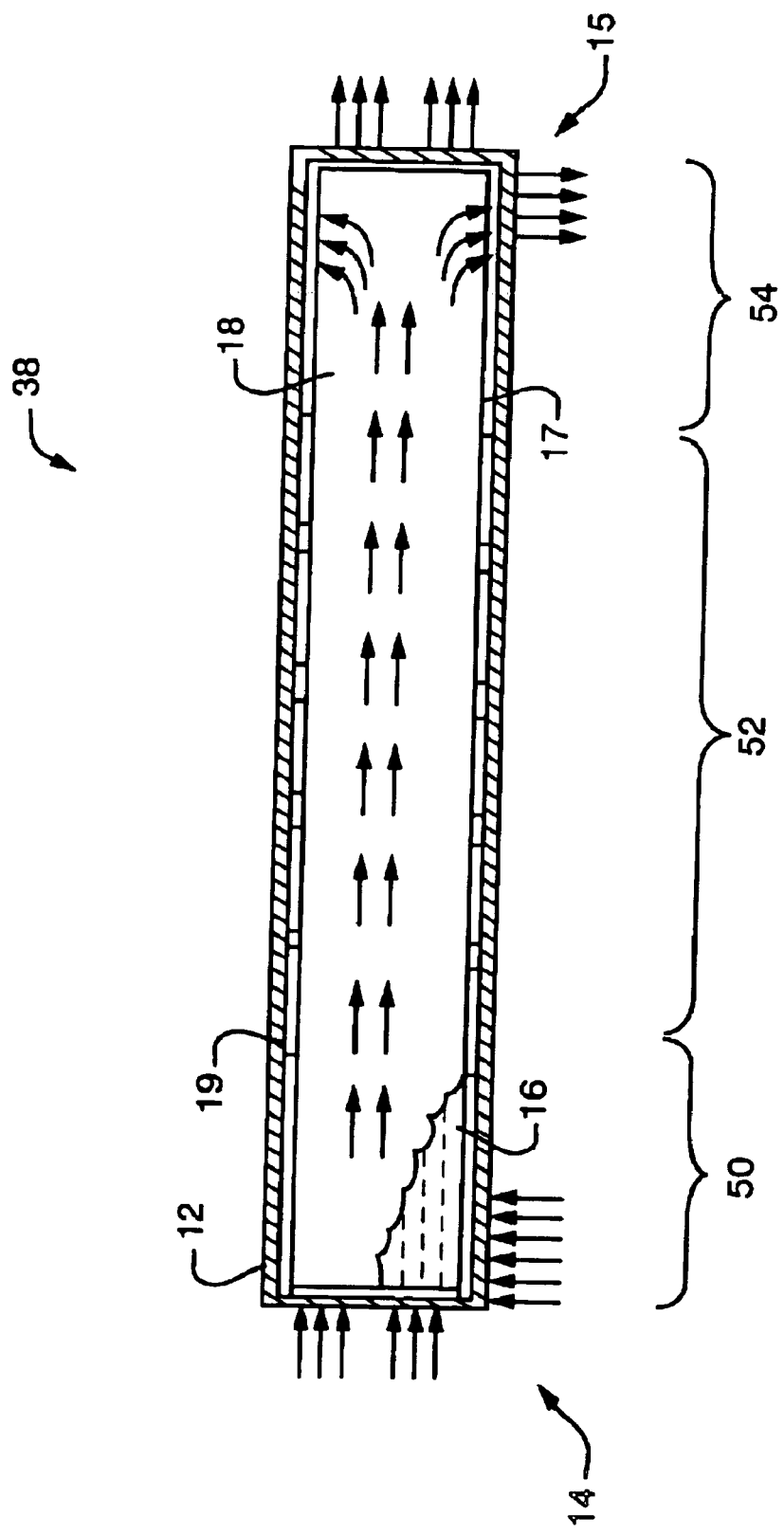
FIG. 2 illustrates a sectional view of a heat pipe assembly.

FIG. 2 illustrates a sectional view of the heat pipe assembly 38. The heat pipe assembly 38 includes a sealed, evacuated shell or tube 12, a fluid 16 filling a portion of the shell 12, and a porous wick 17 lining the inner wall of the tube 12. The shell 12 is typically formed from a thermally conductive material, such as copper, aluminum, or stainless steel, for example. The vacuum within the shell 12 lowers the boiling point of the fluid 16 within the shell 12. The fluid 16, such as water, methanol, or isopropyl alcohol, for example, conventionally fills between 3% and 5% of the volume of the tube 12. The wick 17 is formed of a porous structure, such as a felt material, and runs along the length of the heat pipe assembly 38.

During operation, an input portion 50 of the heat pipe assembly 38 receives heat from a heat source, such as a circuit board component 40. The input portion 14 of the heat pipe assembly 38 transfers the heat from the heat source to the fluid 16 within the shell 12. The heat causes the fluid 16 to reach a boiling point or boiling temperature, thereby causing the fluid 16 to transform into a vapor 18 (e.g., undergo a phase change). The vapor 18 travels within the shell 12 from the input portion 50, through a transfer portion 52, to an output portion 54 of the heat pipe assembly 38 where the temperature at the output portion 54 is relatively lower than the temperature at the input portion 50. As the vapor 18 releases heat at the output portion 54, the output portion 54 transfers the heat away from the heat pipe assembly 38, such as to a heat sink (e.g., support plane 34), and the vapor 18 condenses into a condensate 19. The wick 17 then carries the condensate 19 back to the input portion 50 of the heat pipe assembly 38. The heat pipe assembly 38 provides thermal transfer over relatively large distances while experiencing a negligible temperature drop across the distance.

Returning to FIG. 1, the heat pipe assembly 38 facilitates cooling of the circuit board component 40 regardless of whether the space 42 between the circuit board 36 and the support member 34 is large enough to support an air stream for adequate cooling of the components 40. For example, assume that the space 42 between the circuit board 36 and the support member 34 is relatively narrow (e.g., between approximately of 5 mm and 7 mm) and thereby allows for minimal exposure of the circuit board component 40 to an air stream 28, such as provided by the fan assembly 26. The heat pipe assembly 38 conveys heat from the circuit board component 40 to the support plane 34 in order to cool the component 40 (e.g., transfer heat away from the component 40 having a relatively high temperature to the support plane 34 having a relatively low temperature). In such an arrangement, the support plane 34 acts as a heat sink to dissipate heat transmitted by the heat pipe assembly 38.

As illustrated in FIG. 1, in another arrangement, the air stream 28 provided by the fan assembly 26 travels across a second surface 49 of the support plane 34 (e.g., air stream 28 travels substantially parallel to the support plane). For example, the air stream 28 travels within the slot 29 adjacent to the second surface 49 of the support plane 34. As described, the heat pipe assembly 38 conveys heat from the circuit board component 40 to the support plane 34 in order to cool the component 40. In turn, as the air stream 28 travels across the second surface 49 of the support plane 34, the air stream 28 carries the heat received by the support plane 34 away from the support plane 34. The air stream 28, therefore, maintains a temperature differential between the circuit board component 40 and the support plane 34 (e.g., maintains the support plane 34 at a lower temperature relative to the circuit board component 40), thereby allowing proper operation of the heat pipe assembly 38.

Figure 3:
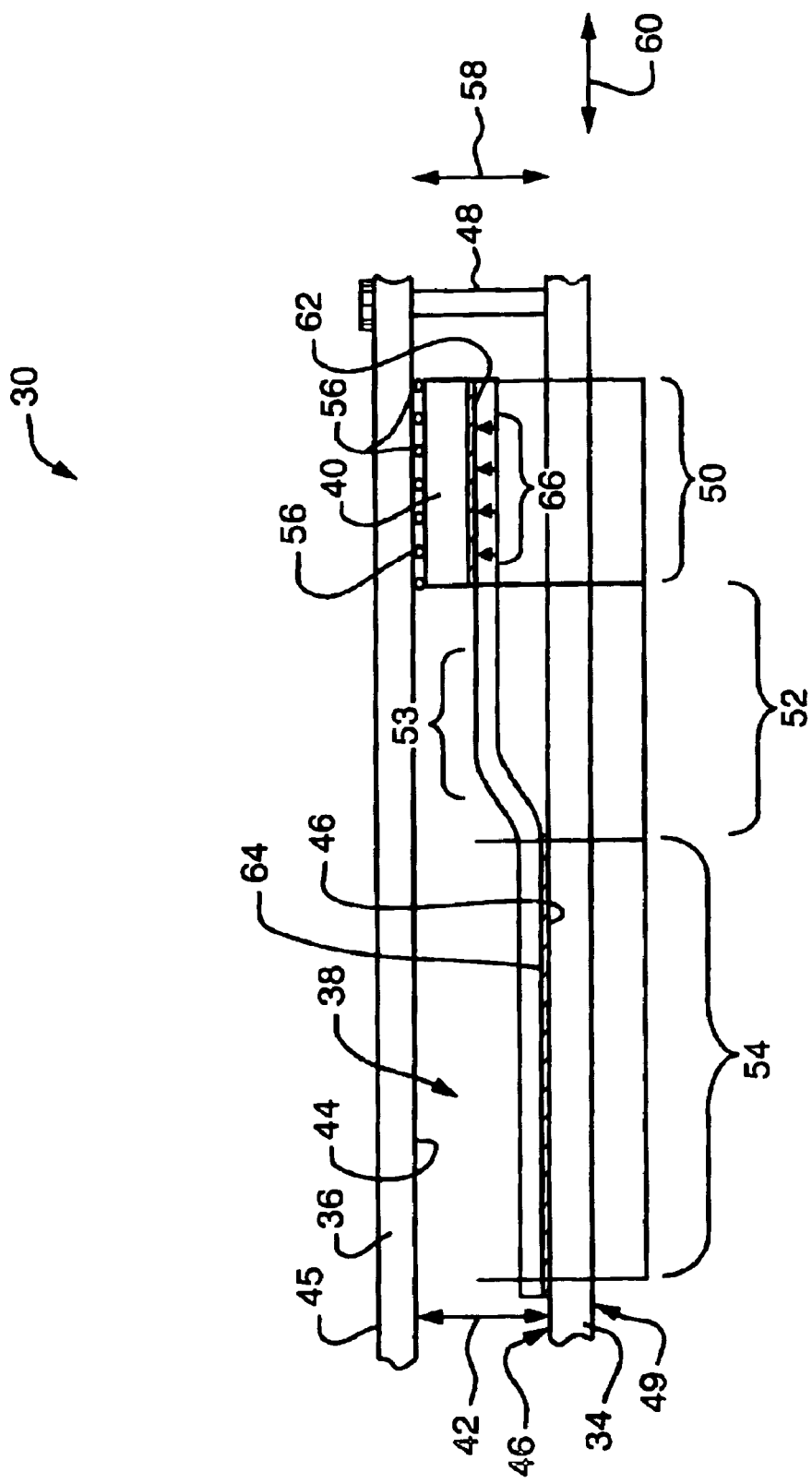
FIG. 3 illustrates a side view of a circuit board assembly, according to one embodiment of the invention.

FIG. 3 illustrates a side view of the circuit board assembly 30. In this configuration, the airflow 28 from the fan assembly 26 is directed across the second surface 49 of the support plane 34 so that the circuit board 36 or support plane 34 does not block the airflow 28. FIG. 3 also shows the heat pipe assembly 38 as part of the circuit board assembly 30 and illustrates an embodiment of a geometric configuration or positioning of the heat pipe assembly 38 relative to the circuit board component 40.

The heat pipe assembly 38 has an input portion 50, a transfer portion 52, and an output portion 54. The input portion 50 of the heat pipe assembly 38 thermally contacts the circuit board component 40 and the output portion 54 thermally contacts the first surface 46 of the support plane 34. The transfer portion 52 of the heat pipe assembly 38 is integrally formed between the input portion 50 and the output portion 54. The transfer portion 52 allows for the transfer of vapor 18 and condensate 19 within the heat pipe assembly 38 between the input portion 50 and the output portion 54.

During operation, the circuit board component 40 generates heat and produces a temperature greater than a temperature of the support plane 34. The input portion 50 of the heat pipe assembly 38 absorbs the heat from the circuit board component 40. The absorbed heat, in turn, converts the fluid 16 within the heat pipe assembly 38 into a vapor 18. The vapor 18 travels through the transfer portion 52 of the heat pipe assembly 38 to the output portion 54 (e.g., the relatively cooler portion of the heat pipe assembly 38). As the temperature of the vapor 18 decreases (e.g., as the vapor cools), the vapor 18 transmits heat to the output portion 54 and returns to a condensate 19 (e.g., liquid state). The output portion 54 of the heat pipe assembly 38, in turn, transfers the heat from the cooling vapor 18 to the support plane 34 for further dissipation (e.g., removal via convection air stream 28 produced by the fan assembly 26).

The input portion 50, transfer portion 52, and output portion 54 of the heat pipe assembly 38 have relatively different stiffnesses or stiffness values. Material stiffness relates to the modulus of elasticity (e.g., ratio of stress to strain) of a material and is defined as the ability for a material to resist deformation. The lower the stiffness (e.g., the higher the modulus of elasticity) of a first material compared to a second material, the more compliant (e.g., able to be deformed) the first material compared to the second material.

The input portion 50 of the heat pipe assemble 38 has a first stiffness and the output portion 54 of the heat pipe assembly 38 has a second stiffness. In one arrangement, the stiffness of the input portion 50 and the stiffness of the output portion 54 relate to the stiffness (e.g., modulus of elasticity) of the material forming either the input portion 50 or output portion 54 (e.g., forming the shell 12 of the heat pipe assembly 38). For example, assume, in one arrangement, the shell 12 of the heat pipe assembly 38 is formed of a copper-type material (e.g., having elastic moduli values between approximately $18*10^6$ pounds per square inch (psi)). The elastic modulus (e.g., stiffness) of the input portion 50 and the output portion 52 of the heat pipe assembly 38, therefore, are equivalent to the elastic modulus (e.g., stiffness) of the copper material forming the shell 12 of the heat pipe assembly 38. In the example, the first stiffness of the input portion 50 and the second stiffness of the output portion 54 are approximately equivalent (e.g., have approximately equal elastic moduli or stiffness values).

The transfer portion 52 has a compliant portion 53 having a third stiffness. The third stiffness of the compliant portion 53 is less stiff than the first stiffness of the input portion 50 or the second stiffness of the output portion 54. Because the compliant portion 53 is less stiff (e.g., is more elastic) than the input portion 50 or the output portion 52, when an assembler secures the heat pipe assembly 38 between the circuit board 36 (e.g., circuit board component 40) and the support plane 34, the third stiffness of the compliant portion 53 allows relative displacement between the input portion 50 and the output portion 54. The compliant portion 53, therefore, helps to control tolerance build-up or tolerance stacking between the circuit board component 40 and the support plane 34. The compliant portion 53, also helps to control a stress generated by the input portion 50 on the circuit board component 40 when the support plane 34 couples to the circuit board 36.

For example, during the assembly process, an assembler (e.g., a person assembling the circuit board assembly 30) places the input portion 50 of the heat pipe assembly 38 against the circuit board component 40 and secures the support plane 34 to the circuit board 36. Such securing causes the input portion 50 of the heat pipe assembly 38 to apply a load or a stress 66 against the circuit board component 40. As the input portion 50 generates the load 66 on the circuit board component 40, the circuit board component 40 generates an opposite force or load on the input portion 50. The input portion 50 transmits the opposing force to the compliant portion 53 of the transfer portion 52. As described, the stiffness of the compliant portion 53 is less than the stiffness of either the input portion 50 or the output portion 54. Therefore, the load or stress transferred from the input portion 50 to the compliant portion 53 causes displacement (e.g., bending or flattening) of the compliant portion 53. Such displacement allows both a lateral translation 58 and a vertical translation 60 of the input portion 50 relative to the output portion 54 of the heat pipe assembly 38.

Because the compliant portion 53 displaces during loading of the input portion 50, the compliant portion 53 acts to absorb a portion of the load generated between the input portion 50 and the circuit board component 40, thereby reducing the load per unit area, or stress, of the input portion 50 on the circuit board component 40. By controlling the load or stress, generated by the input portion 50, on the circuit board component 40, the compliant portion 53 limits or minimizes damage to the circuit board component 40 or to the connection between the circuit board component 40 and the circuit board 36, caused by the heat pipe assembly 38.

For example, as shown in FIG. 3, the circuit board component 40 attaches to the first surface 44 (e.g. solder side) of the circuit board 36 with solder connections or solder balls 56. When exposed to relatively high stresses or loads, the solder connections sever from the circuit board 36 (e.g., crack), thereby impeding operation of the circuit board component 40. Because the compliant portion 53 displaces under loading (e.g., as caused by the lower relative stiffness of the complaint portion 53), the complaint portion 53 reduces the effective load (e.g., the axial load along the lateral displacement 58 direction) placed on the circuit board component 40. The complaint portion 53, therefore, helps to maintain the integrity of the solder connection 56 between the circuit board component 40 and the circuit board 36.

In one arrangement, a manufacturer or assembler creates (e.g., controls) the third stiffness of the compliant portion 53 through a process of annealing. During the annealing process, the manufacturer heats and cools the transfer portion 52 of the heat pipe assembly 38. The annealing process changes the physical, material property of the transfer portion 52 thereby making at least a part of the transfer portion 52 (e.g., the compliant portion 53) less stiff (e.g., increasing the elastic modulus of material) than the input portion 50 or the output portion 54 of the heat pipe assembly 38.

For example, assume the shell 12 of the heat pipe assembly 38 is formed from a copper material having a given modulus of elasticity. In such a case, the modulus of elasticity or stiffness of the heat pipe assembly 38 (e.g., the shell 12 forming the heat pipe assembly 38) is approximately uniform among the input portion 50, transfer portion 52 and output portion 54. During the annealing process, a manufacturer, for example, heats and cools a section of the transfer portion 52 of the heat pipe assembly 38, thereby reducing the stiffness of the section (e.g., forming the compliant portion 53), compared to either the input portion 50 or output portion 54.

FIG. 3 also illustrates thermal interface layers 62, 64 that secure the input portion 50 to the circuit board component and the output portion 54 to the support plane 34, respectively. The thermal interface layers 62, 64, furthermore, provide thermal coupling between the heat pipe assembly 38 and the circuit board component 40 and between the heat pipe assembly 38 and the support plane 34 and also decrease interface thermal resistance (e.g., such as provided by an air gap) between the heat pipe assembly 38 and the circuit board component 40 and between the heat pipe assembly 38 and the support plane 34.

In one arrangement, the thermal interface layers are configured as thermal adhesive layers 62, 64. A first thermal adhesive layer 62 is located between the circuit board component 40 and the input portion 50 of the heat pipe assembly 38 and a second thermal adhesive layer 64 is located between the support plane 34 and the output portion 54 of the heat pipe assembly 38. The thermal adhesive layers 62, 64 secure the input portion 50 of the heat pipe assembly 38 to the circuit board component 40 and the output portion 54 of the heat pipe assembly 38 to the support plane 34, respectively.

The thermal adhesive layer 62, in one arrangement, maintains thermal contact between the circuit board component 40 and the input portion 50 when the thermal adhesive layer 62 experiences shear stresses between the circuit board component 40 and the input portion 50. As described, during assembly, the input portion 50 undergoes a lateral translation 60 relative to the output portion 54 of the heat pipe assembly 38. Such a lateral translation 60 places a shear stress on the thermal adhesive 62 located between the input portion 50 and the circuit board component 40. The thermal adhesive layer 62 maintains thermal contact between the circuit board component 40 and the input portion 50 when exposed to such a shear stress.

Figure 4:
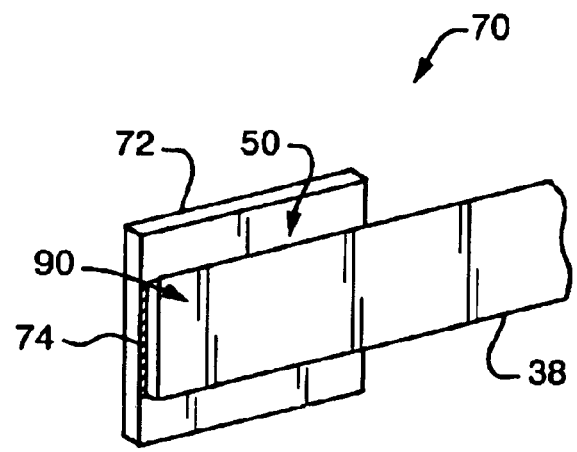
FIG. 4 illustrates the heat pipe assembly of FIG. 2, according to one embodiment of the invention.
Figure 5:
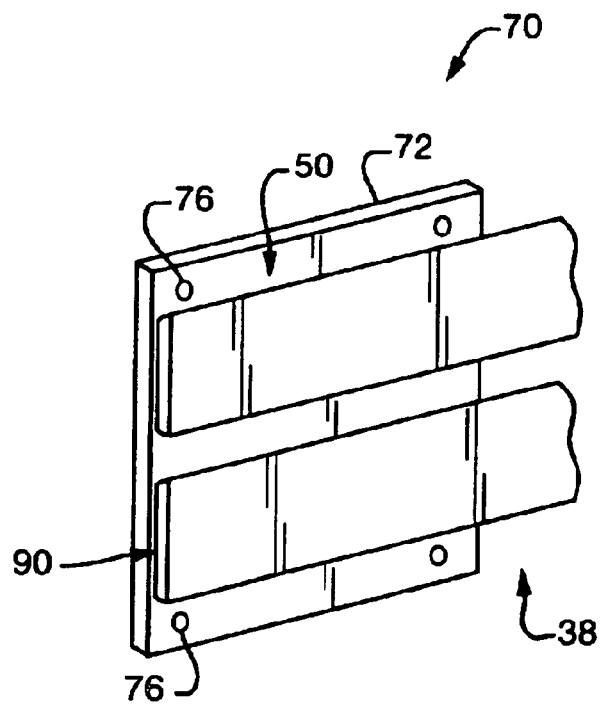
FIG. 5 illustrates the heat pipe assembly of FIG. 2, according to another embodiment of the invention.

As described above, the first thermal adhesive layer 62 secures the input portion 50 of the heat pipe assembly 38 to the circuit board component 40 and provides thermal transfer between the circuit board component 40 and the input portion 50. FIGS. 4 and 5 illustrate another arrangement for the input portion 50 attaching to the circuit board component 40.

FIGS. 4 and 5 illustrate the use of a coupling interface 70 with the input portion 50 to allow for thermal contact and thermal transfer between the input portion 50 and the circuit board component 40 and to allow for removal of the input portion 50 (e.g., heat pipe assembly 38) from the circuit board component 40.

In FIG. 4, in one arrangement, the coupling interface 70 is configured as a contact pad 72 attached to the input portion 50 of the heat pipe assembly 38. In one arrangement, the contact pad 72 is formed of a thermally conductive material. For example, the contact pad 72, in one arrangement, is a copper pad that provides thermal transfer between the circuit board component 40 and the input portion 50. In another arrangement, the input portion 50 of the heat pipe assembly 38 attaches to the contact pad 72 with a solder layer 74. The solder layer 74 also provides for relatively efficient thermal conduction from the circuit board component 40 to the heat pipe assembly 38. The contact pad 72 attaches to the circuit board component 40 using a thermal interface material (e.g., a thermal coupling material), such as a thermally conductive grease that allows for removal of the contact pad 72 and heat pipe assembly 38 from the circuit board component 40.

FIG. 5 illustrates an alternate arrangement of the contact pad 72. The contact pad 70 defines openings 76 that allow a user to attach (e.g., removably attach) the contact pad 72 to the circuit board 36 using fasteners. During assembly, an assembler places the contact pad 72 in communication with the circuit board component 40 and aligns the openings 76 of the contact pad 72 with corresponding openings defined by the circuit boars 36. The assembler places fasteners (e.g., screws) through the contact pad openings 76 and corresponding circuit board openings to secure the contact pad 72 to the circuit board 36 and provide thermal contact among the circuit board component 40, the contact pad 72 and the heat pipe assembly 38. The openings 76 defined by the contact pad 72 allow for removal of the contact pad 72 and the input portion 50 from the circuit board component 40 without damaging the circuit board component 40.

Figure 6:
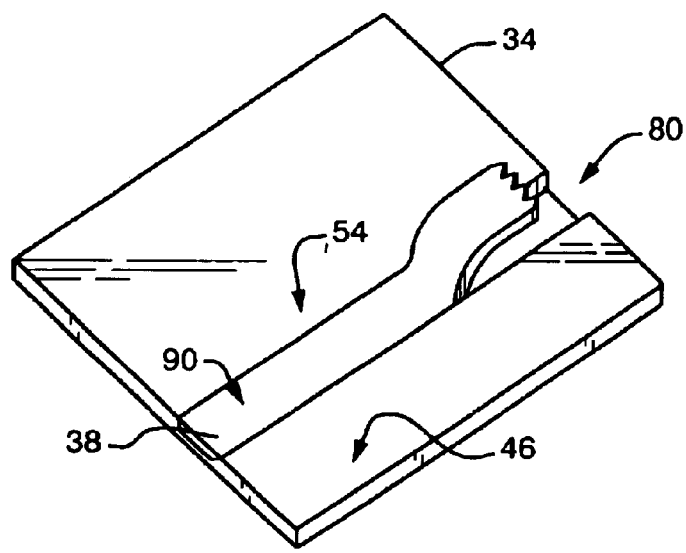
FIG. 6 illustrates the support plane of FIG. 2, according to one embodiment of the invention.

Returning to FIG. 3, the second thermal adhesive layer 64 located between the output portion 54 of the heat pipe assembly 38 and the support plane 34 also secures the output portion 54 and the support plane 34. FIG. 6 illustrates another arrangement for the output portion 54 attaching to the support plane 34.

FIG. 6 illustrates an arrangement of the support plane 34 configured to removably secure the output portion 54 of the heat pipe assembly 38. As illustrated, the first surface 46 of the support plane 34 defines a groove or channel 80. The channel 80 allows removable coupling between the output portion 54 of the heat pipe assembly 38 and the support plane 34 and provides thermal contact between the output portion 50 and the support plane 34. For example, the channel 80 of the support plane 34 creates a friction fit with the output portion 54 of the heat pipe assembly 38. Such a friction fit secures the heat-assembly 38 to the support plane 34 and allows for thermal transfer (e.g., thermal contact) from the output portion 54 to the support plane 34. The friction fit of the channel 80 and output portion 54 also allows a user to add or remove the heat pipe assembly 38 from the support plane 34.

In one arrangement, a manufacturer forms the channel within the support plane 34 using a stamping process (e.g., impacting the support plane using a channel-shaped die). Alternately, the manufacturer forms the channel 80 within the support plane 34 using a milling process (e.g., removing material from the support plane 34 to create the channel 80).

FIGS. 4, 5, and 6 illustrate an arrangement of the geometry of both the input portion 50 and output portion 54 of the heat pipe assembly 38. In the arrangement shown, the input portion 50 and the output portion 54 of the heat pipe assembly 38 each define a substantially flat portion 90 of the heat pipe assembly 38. The substantially flat portion 90 of the input portion 50 and of the output portion 54 of the heat pipe assembly 38 increases the surface area of the heat pipe assembly 38 in contact with either circuit board component 40 or the support plane 34, respectively (e.g., as compared to a substantially tubular heat pipe assembly). Such an increase in the contact surface area between the heat pipe assembly 38 and the circuit board component 40 provides greater transfer of heat from either the circuit board component 40 to the input portion 50 or from the output portion 54 to the support plane 34.

As described above, the heat pipe assembly 38 transfers heat from the circuit board component 40 to the support plane 34 in order to cool the component 40. The heat pipe assembly 38 transfers the heat when a temperature differential exists between the circuit board component 40 and the support plane 34 (e.g., the temperature of the support plane 34 is at a lower temperature than the circuit board component 40). Over time, in the absence of a convection current (e.g., air stream 28) to carry heat away from the support plane 34, the temperature of the support plane 34 increases, thereby reducing the temperature differential between the circuit board component 40 and the support plane 34. Such a decrease in the temperature differential can potentially affect the performance (e.g., thermal transference) of the heat pipe assembly 38.

Figure 7:
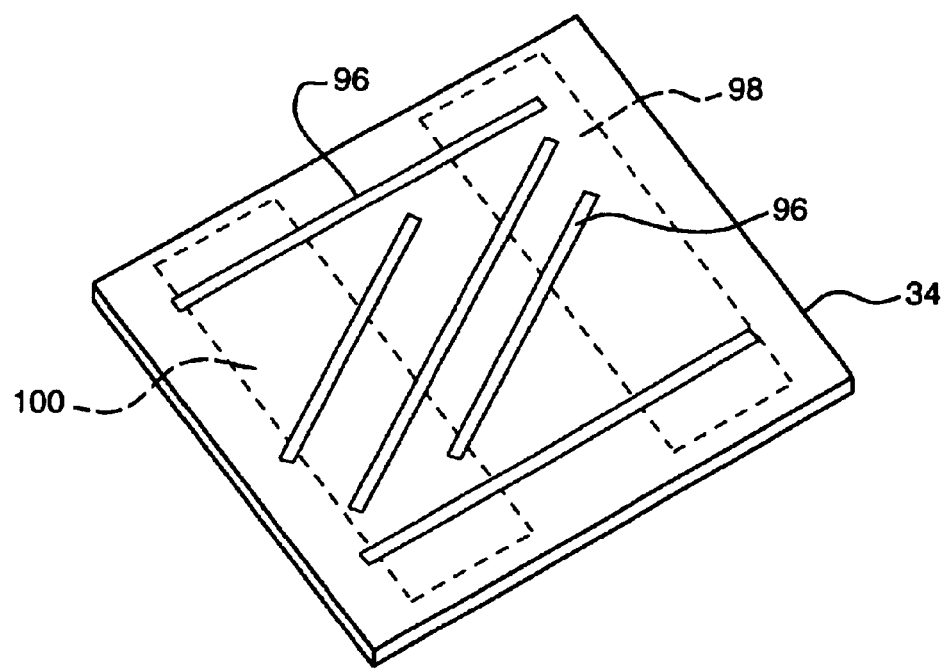
FIG. 7 illustrates the support plane of FIG. 2, according to another embodiment of the invention.
Figure 8:
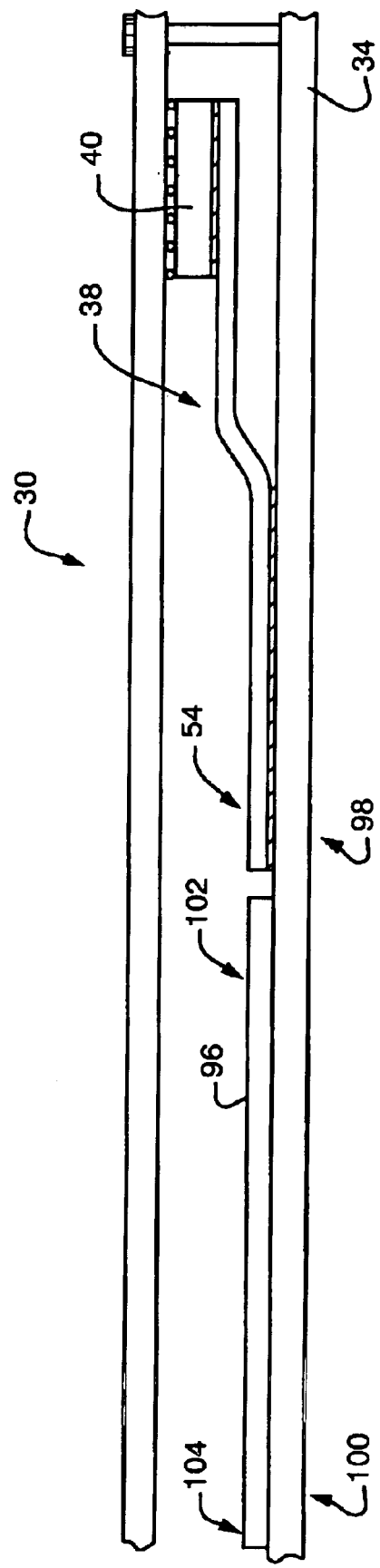
FIG. 8 illustrates a side view of the support plane of FIG. 7.

FIGS. 7 and 8 illustrate the use of one or more support plane heat pipes 96 in conjunction with the circuit board assembly 30. The support plane heat pipe 96 provides thermal transfer from a first thermal region 98 of the support plane 34 to a second thermal region 100 of the support plane 34. Such thermal transfer reduces the temperature of the first thermal region 98, thereby increasing the thermal conductivity of the support plane 34 and reducing the thermal resistance of the support plane 34 in the first thermal region 98.

For example, as shown in FIG. 8, during operation of the circuit board component 40, the heat pipe assembly 38 transfers heat, generated by the circuit board component 40, to the support plane 34 via the output portion 54. Over time, the temperature of the support plane 34 at the location of contact between the output portion 54 and the support plane 34 (e.g., the first thermal region 98) increases. To maintain the temperature differential between the circuit board component 40 and the support plane 34 at the first thermal region 98, an input portion 102 of the support plane heat pipe 96 contacts the first thermal region 98 (e.g., high temperature region) of the support plane 34 and absorbs heat from the region 98. The support plane heat pipe 96 transmits the heat to an output portion 104 of the support plane heat pipe 96, where the output portion 104 contacts a second thermal region 100 (e.g., low temperature region) of the support plane 34. The support plane heat pipe 96, therefore, in one arrangement, directs or moves heat from a high temperature region to a low temperature region on the support plane 34, thereby enhancing the thermal performance of the support plane 34 (e.g., reduce thermal resistance of the support plane 34)

Figure 9:
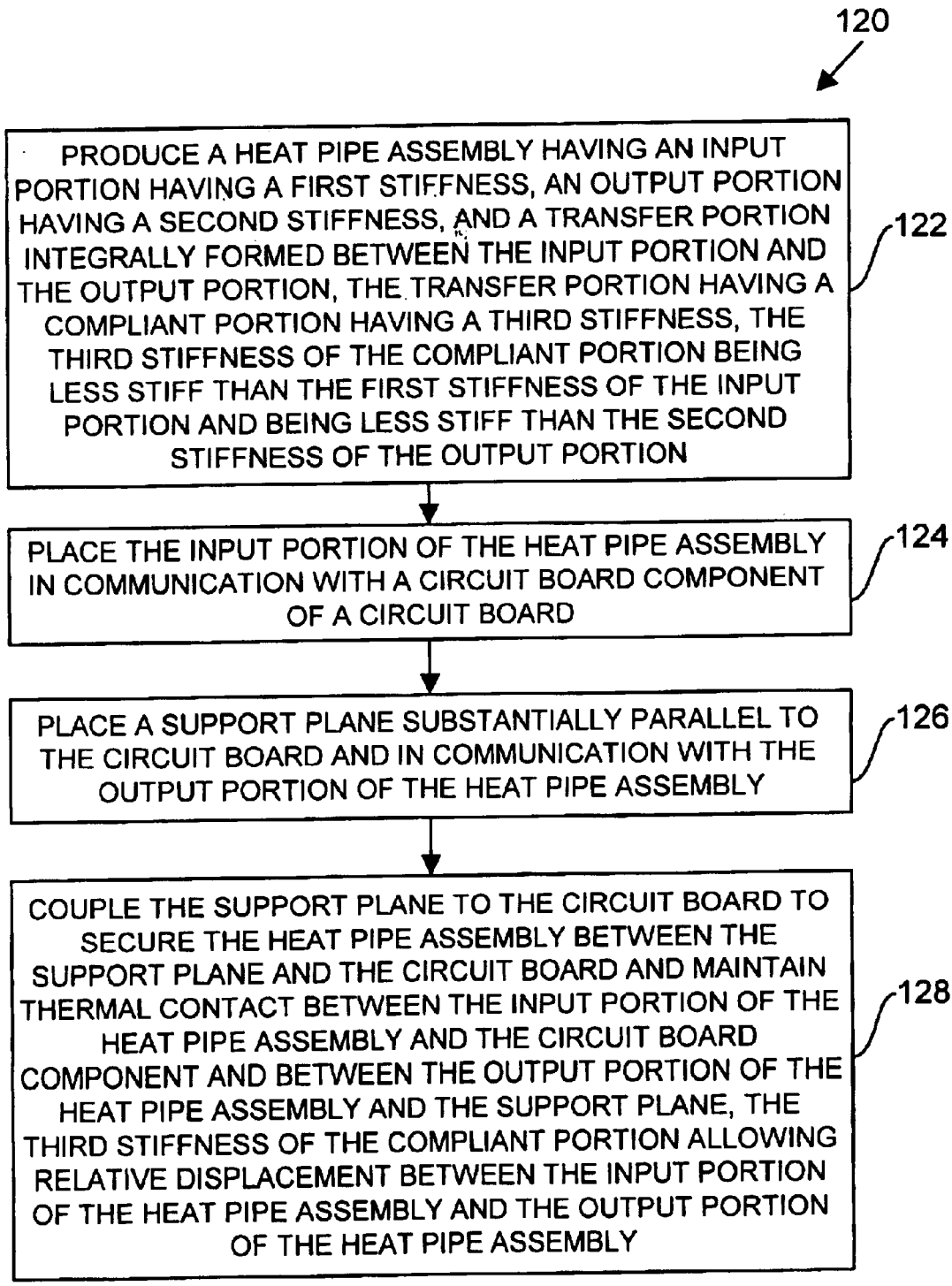
FIG. 9 illustrates a flowchart of a procedure for assembling a circuit board assembly, according to one embodiment of the invention.

FIG. 9 illustrates a flowchart for a method 120 of assembling a circuit board assembly 30. Such a method can be performed either manually (e.g., by a technician on an assembly line) or automatically (e.g., by automated equipment).

In step 122, an assembler produces a heat pipe assembly 38 having an input portion 50 having a first stiffness, an output portion 54 having a second stiffness, and a transfer portion 52 integrally formed between the input portion 50 and the output portion 54, the transfer portion 52 having a compliant portion 53 having a third stiffness, the third stiffness of the compliant portion 53 being less stiff than the first stiffness of the input portion 50 and being less stiff than the second stiffness of the output portion 54.

In step 124, the assembler places the input portion 50 of the heat pipe assembly 38 in communication with a circuit board component 40 of a circuit board 36. As described above, the input portion 50 of the heat pipe assembly 38 absorbs heat from the circuit board component 40 during operation of the component 40.

In step 126, the assembler places a support plane 34 substantially parallel to the circuit board 36 and in communication with the output portion 54 of the heat pipe assembly 38. As described above, the output portion 54 of the heat pipe assembly 38 transfers the heat absorbed by the input portion 50 to the support plane 34 for dissipation by the support plane 34.

In step 128, the assembler couples the support plane 34 to the circuit board 36 to secure the heat pipe assembly 38 between the support plane 34 and the circuit board 36 and maintain thermal contact between the input portion 50 of the heat pipe assembly 38 and the circuit board component 40 and between the output portion 54 of the heat pipe assembly 38 and the support plane 34. The third stiffness of the compliant portion 53 allows relative displacement between the input portion 50 of the heat pipe assembly 38 and the output portion 54 of the heat pipe assembly 38.

Because the compliant portion 53 allows relative displacement between the input portion 50 and the output portion 54, the compliant portion 53 controls a load or stress generated by the input portion 50 on the circuit board component 40 when the support plane 34 couples to the circuit board 36. Such load control minimizes damage to the circuit board component 40 or connection 56 between the circuit board component 40 and the circuit board 36.

In one arrangement, the assembler forms a substantially flat portion 90 with the input portion 50 and the output portion 54 of the heat sink assembly 38. Such formation of the substantially flat portion 90 increases the surface area of the heat pipe assembly 38 in thermal contact with the circuit board component 40, thereby providing an increase in the thermal transfer of the input portion 50 and output portion 54.

In another arrangement, the assembler attaches a contact pad 72 to the input portion 50 of the heat pipe assembly 38. The contact pad 72 provides a coupling interface between the input portion 50 and the circuit board component 40 and maintains thermal contact between the circuit board component 40 and the input portion 50.

In another arrangement, the assembler forms a channel 80 within the support plane 34. The channel 80 provides removable coupling between the output portion 54 of the heat pipe assembly 38 and the support plane 34 and provides thermal contact between the output portion 50 and the support plane 34.

In another arrangement, the assembler couples a support plane heat pipe 96 to the support plane 34, the support plane heat pipe 96 configured to provide thermal transfer from a first thermal region 98 of the support plane 34 to a second thermal region 100 of the support plane 34. As described above, such thermal transfer reduces the temperature of the first thermal region 98, thereby increasing the thermal conductivity of the support plane 34 and reducing the thermal resistance of the support plane 34 in the first thermal region 98.

Those skilled in the art will understand that there can be many variations made to the embodiments explained above while still achieving the same objective of those embodiments and the invention in general.

As described above, a heat pipe assembly 38 transfers heat from the circuit board component to the support plane 34. FIGS. 1 and 5, however, illustrate an alternate arrangement whereby the circuit board assembly 30 utilizes multiple heat pipe assemblies 38. For example, as shown in FIG. 1, a first heat pipe assembly 38-1 and a second heat pipe assembly 38-2 attach between the circuit board component 40 and the support plane 34. Multiple heat pipe assemblies 38-1, 38-2 increase heat transfer from the circuit board component 40 to the support plane 34.

Also as described above, FIGS. 4 and 5 illustrate the use of a contact pad 72 with the input portion 50 to increase the thermal contact area between the input portion 50 and the circuit board component 40 and to allow for thermal transfer between the input portion 50 and the circuit board component 40. The contact pad also allows for removal of the input portion 50 (e.g., heat pipe assembly 38) from the circuit board component 40. In another arrangement, the contact pad 72 couples to the output portion 54 of the heat sink assembly 38 to increase the thermal contact area between, and allow for thermal transfer between, the output portion 54 and the support plane 34 and to allow for removal of the output portion 54 from the support plane 34.

Also as described above, the contact pad 72 attaches to the circuit board component 40 using a thermal coupling material, such as a thermally conductive grease that allows for removal of the contact pad 72 and heat pipe assembly 38 from the circuit board component 40 and decreases interface thermal resistance between the input portion 50 of the heat pipe assembly 38 and the circuit board component 40. In another arrangement, contact pad 72 attaches to the circuit board component 40 using the thermal coupling material, such as a thermal adhesive layer 62. The thermal adhesive layer 62 provides secure coupling between the contact pad 72 and the circuit board component 40.

Such variations are intended to be covered by the scope of this invention. As such, the foregoing description of embodiments of the invention is not intended to be limiting. Rather, any limitations to the invention are presented in the following claims.

What is claimed is:

1. A heat pipe assembly configured to provide thermal transfer between a circuit board component, mounted to a circuit board, and a support plane substantially parallel to the circuit board, the circuit board and a first surface of the support plane defining a space between the circuit board and support plane and the circuit board component oriented within the space defined by the circuit board and first surface of the support plane, the heat pipe assembly configured to orient between the support plane and the circuit board and the heat pipe assembly comprising:
    an input portion configured to thermally contact the circuit board component, the input portion having a first stiffness;
    an output portion configured to thermally contact the first surface of the support plane, the output portion having a second stiffness; and
    a transfer portion integrally formed between the input portion and the output portion, the transfer portion having compliant portion having a third stiffness, the third stiffness of the compliant portion being less stiff than the first stiffness of the input portion and being less stiff than the second stiffness of the output portion, the third stiffness of the compliant portion allowing relative displacement between the input portion and the output portion.

2. The heat pipe assembly of claim 1 wherein the input portion defines a substantially flat portion, the substantially flat portion providing a surface area of the heat pipe assembly in thermal contact with the circuit board component.

3. The heat pipe assembly of claim 1 wherein the output portion defines a substantially flat portion, the substantially flat portion providing a surface area of the heat pipe assembly in thermal contact with the support plane.

4. The heat pipe assembly of claim 1 further comprising a contact pad coupled to the input portion, the contact pad providing a coupling interface between the input portion and the circuit board component.

5. The heat pipe assembly of claim 1 wherein the support plane defines a channel, the channel providing coupling between the output portion and the support plane.

6. The heat pipe assembly of claim 1 wherein the compliant portion is configured to absorb a portion of a load generated between the input portion and the circuit board component.

7. The heat pipe assembly of claim 1 wherein the input portion comprises a metal material, the output portion comprises a metal material and the compliant portion comprises an annealed metal material, the annealed metal material having a third stiffness, the third stiffness being less stiff than the first stiffness of the input portion and being less stiff than the second stiffness of the output portion.

8. The heat pipe assembly of claim 1 wherein the circuit board component includes a device package; wherein the support plane includes a metallic tray; wherein the circuit board holds the device package and the support plane in fixed positions relative to each other; and
    wherein (i) the input portion of the heat pipe assembly is in substantial thermal communication with the device package and (ii) the output portion of the heat pipe assembly is in substantial thermal communication with the metallic tray, to enable the heat pipe assembly to operate as a thermal conduit between the device package and the metallic tray with the device package and the metallic tray being otherwise substantially thermally isolated from each other.

9. A circuit board assembly comprising:
    a circuit board;
    a support plane substantially parallel to and coupled with the circuit board, the support plane having a first surface and a second surface, the circuit board and first surface of the support plane defining a space between the circuit board and support plane;
    a circuit board component mounted to the circuit board, the circuit board component oriented within the space defined by the circuit board and first surface of the support plane; and
    a heat pipe assembly oriented between the support plane and the circuit board and configured to provide thermal transfer between the circuit board component and the support plane, the heat pipe having:
        an input portion configured to thermally contact the circuit board component, the input portion having a first stiffness;
        an output portion configured to thermally contact the first surface of the support plane, the output portion having a second stiffness; and
        a transfer portion integrally formed between the input portion and the output portion, the transfer portion having a compliant portion having a third stiffness, the third stiffness of the compliant portion being less stiff than the first stiffness of the input portion and being less stiff than the second stiffness of the output portion, the third stiffness of the compliant portion allowing relative displacement between the input portion and the output portion.

10. The circuit board assembly of claim 9 wherein the input portion defines a substantially flat portion, the substantially flat portion providing a surface area of the heat pipe assembly in thermal contact with the circuit board component.

11. The circuit board assembly of claim 9 wherein the output portion defines a substantially flat portion, the substantially flat portion providing a surface area of the heat pipe assembly in thermal contact with the support plane.

12. The circuit board assembly of claim 9 further comprising a contact pad coupled to the input portion, the contact pad providing a coupling interface between the input portion and the circuit board component.

13. The circuit board assembly of claim 9 wherein the support plane defines a channel, the channel providing coupling between the output portion of the heat pipe and the support plane.

14. The circuit board assembly of claim 9 further comprising a support plane heat pipe configured to provide thermal transfer from a first thermal region of the support plane to a second thermal region of the support plane.

15. The circuit board assembly of claim 9 wherein the compliant portion is configured to absorb a portion of a load generated between the input portion and the circuit board component.

16. The circuit board assembly of claim 9 wherein the input portion comprises a metal material, the output portion comprises a metal material and the compliant portion comprises an annealed metal material, the annealed metal material having a third stiffness, the third stiffness being less stiff than the first stiffness of the input portion and being less stiff than the second stiffness of the output portion.

17. The circuit board assembly of claim 9 wherein the circuit board component includes a device package; wherein the support plane includes a metallic tray; wherein the circuit board holds the device package and the support plane in fixed positions relative to each other; and
  wherein (i) the input portion of the heat pipe assembly is in substantial thermal communication with the device package and (ii) the output portion of the heat pipe assembly is in substantial thermal communication with the metallic tray, to enable the heat pipe assembly to operate as a thermal conduit between the device package and the metallic tray with the device package and the metallic tray being otherwise substantially thermally isolated from each other.

18. A method for assembling a circuit board assembly comprising the steps of:
  producing a heat pipe assembly having an input portion having a first stiffness, an output portion having a second stiffness, and a transfer portion integrally formed between the input portion and the output portion, the transfer portion having a compliant portion having a third stiffness, the third stiffness of the compliant portion being less stiff than the first stiffness of the input portion and being less stiff than the second stiffness of the output portion;
  placing the input portion of the heat pipe assembly in communication with a circuit board component of a circuit board;
  placing a support plane substantially parallel to the circuit board and in communication with the output portion of the heat pipe assembly; and
  coupling the support plane to the circuit board to secure the heat pipe assembly between the support plane and the circuit board and maintain thermal contact between the input portion of the heat pipe assembly and the circuit board component and between the output portion of the heat pipe assembly and the support plane, the third stiffness of the compliant portion allowing relative displacement between the input portion of the heat pipe assembly and the output portion of the heat pipe assembly.

19. The method of claim 18 further comprising the step of forming a substantially flat portion with the input portion, the substantially flat portion providing a surface area of the heat pipe assembly in thermal contact with the circuit board component.

20. The method of claim 18 further comprising the step of forming a substantially flat portion with the output portion, the substantially flat portion providing a surface area of the heat pipe assembly in thermal contact with the support plane.

21. The method of claim 18 further comprising the step of attaching a contact pad to the input portion, the contact pad providing a coupling interface between the input portion and the circuit board component.

22. The method of claim 18 further comprising the step of forming a channel within the support plane, the channel providing coupling between the output portion and the support plane.

23. The method of claim 18 further comprising the step of coupling a support plane heat pipe to the support plane, the support plane heat pipe configured to provide thermal transfer from a first thermal region of the support plane to a second thermal region of the support plane.

24. A computer system comprising:
  a frame;
  an air stream source coupled to the frame; and
  at least one circuit board assembly coupled to the frame, the circuit board assembly having:
    a circuit board,
    a support plane substantially parallel to and coupled with the circuit board, the support plane having a first surface and a second surface, the circuit board and first surface of the support plane defining a space between the circuit board and support plane and the support plane positioned within an air stream provided by the air stream source,
    a circuit board component mounted to the circuit board, the circuit board component oriented within the space defined by the circuit board and first surface of the support plane, and
    a heat pipe assembly oriented between the support plane and the circuit board and configured to provide thermal transfer between the circuit board component and the support plane, the heat pipe having:
      an input portion configured to thermally contact the circuit board component, the input portion having a first stiffness,
      an output portion configured to thermally contact the first surface of the support plane, the output portion having a second stiffness, and
      a transfer portion integrally formed between the input portion and the output portion, the transfer portion having a compliant portion having a third stiffness, the third stiffness of the compliant portion being less stiff than the first stiffness of the input portion and being less stiff than the second stiffness of the output portion, the third stiffness of the compliant portion allowing relative displacement between the input portion and the output portion.

25. The computer system of claim 24 wherein the input portion defines a substantially flat portion, the substantially flat portion providing a surface area of the heat pipe assembly in thermal contact with the circuit board component.

26. The computer system of claim 24 wherein the output portion defines a substantially flat portion, the substantially flat portion providing a surface area of the heat pipe assembly in thermal contact with the support plane.

27. The computer system of claim 24 further comprising a contact pad coupled to the input portion, the contact pad providing a coupling interface between the input portion and the circuit board component.

28. The computer system of claim 24 wherein the support plane defines a channel, the channel providing coupling between the output portion of the heat pipe and the support plane.

29. The computer system of claim 24 further comprising a support plane heat pipe configured to provide thermal transfer from a first thermal region of the support plane to a second thermal region of the support plane.

* * * * *